(12) United States Patent
Yang et al.

(10) Patent No.: US 11,520,818 B2
(45) Date of Patent: Dec. 6, 2022

(54) METHOD, APPARATUS AND COMPUTER PROGRAM PRODUCT FOR MANAGING METADATA OF STORAGE OBJECT

(71) Applicant: EMC IP Holding Company LLC, Hopkinton, MA (US)

(72) Inventors: Yong Yang, Shanghai (CN); Jiang Cao, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 205 days.

(21) Appl. No.: 16/560,955

(22) Filed: Sep. 4, 2019

(65) Prior Publication Data

US 2020/0349186 A1 Nov. 5, 2020

(30) Foreign Application Priority Data

Apr. 30, 2019 (CN) .......................... 201910361284.X

(51) Int. Cl.
*G06F 16/38* (2019.01)
*G06F 16/33* (2019.01)
*G06F 16/338* (2019.01)
*G06F 16/31* (2019.01)
*G06F 3/06* (2006.01)

(52) U.S. Cl.
CPC .............. *G06F 16/38* (2019.01); *G06F 3/067* (2013.01); *G06F 3/0617* (2013.01); *G06F 3/0641* (2013.01); *G06F 3/0647* (2013.01); *G06F 3/0655* (2013.01); *G06F 16/322* (2019.01); *G06F 16/334* (2019.01); *G06F 16/338* (2019.01)

(58) Field of Classification Search
CPC .......... G06F 3/067; G06F 3/061; G06F 3/064; G06F 12/1009; G06F 2212/1016; G06F 2212/1044; G06F 2212/7208; G06F 3/0647; G06F 3/0653; G06F 3/0665; G06F 12/0868; G06F 12/0882; G06F 16/2246; G06F 21/64; G06F 16/182; G06F 16/188; G06F 16/30; G06F 16/322; G06F 16/338; G06F 3/0617; G06F 3/0641; G06F 3/0655
See application file for complete search history.

(56) References Cited

U.S. PATENT DOCUMENTS 8,892,818 B1 * 11/2014 Zheng ................... G06F 3/0665
 711/114
2011/0153687 A1 * 6/2011 Bacher .................... G06F 16/22
 707/812

(Continued)

*Primary Examiner* — Yuk Ting Choi
(74) *Attorney, Agent, or Firm* — Amin, Turocy & Watson, LLP

(57) ABSTRACT

Metadata of a storage object is managed. An example method for managing metadata of a storage object comprises: in response to receiving a request to access metadata of a storage object, obtaining a first identifier of the storage object from the request; determining, based on the first identifier, a second identifier of a page where the metadata is located, an address of the page and the second identifier being stored in association in an entry of a page table distributed among a plurality of storage devices with different access speeds; determining, from the plurality of storage devices, a storage device storing the entry; and obtaining the address of the page by accessing the entry from the storage device, so as to access the metadata from the page.

20 Claims, 6 Drawing Sheets

(56) References Cited

U.S. PATENT DOCUMENTS

| | | | | |
|---|---|---|---|---|
| 2013/0124780 A1* | 5/2013 | Baderdinni | ........... | G06F 3/0647 |
| | | | | 711/103 |
| 2014/0351504 A1* | 11/2014 | Kawaba | ................ | G06F 3/0685 |
| | | | | 711/113 |
| 2015/0280959 A1* | 10/2015 | Vincent | ................ | G06F 3/0622 |
| | | | | 709/203 |
| 2016/0048333 A1* | 2/2016 | Zheng | ................... | G06F 3/0646 |
| | | | | 711/103 |
| 2016/0063021 A1* | 3/2016 | Morgan | ................ | G06F 16/148 |
| | | | | 707/747 |
| 2016/0085480 A1* | 3/2016 | Chiu | ...................... | G06F 3/061 |
| | | | | 711/117 |

\* cited by examiner

METHOD, APPARATUS AND COMPUTER PROGRAM PRODUCT FOR MANAGING METADATA OF STORAGE OBJECT

RELATED APPLICATION

The present application claims the benefit of priority to Chinese Patent Application No. 201910361284.X, filed on Apr. 30, 2019, which application is hereby incorporated into the present application by reference herein in its entirety.

FIELD

Embodiments of the present disclosure generally relate to the field of data storage, and more specifically, to a method, an apparatus and a computer program product for managing metadata of a storage object.

BACKGROUND

An object storage system typically does not rely on a file system to manage data. In the object storage system, all storage space can be divided into fixed-size chunks. User data can be stored as an object (also referred to as a "storage object") stored in a chunk. The object may have metadata associated with it for recording attributes and other information of the object (such as an address of the object, etc.). Before actually accessing a storage object, it is usually required to first access the metadata of the object. Due to importance of metadata and high frequency of access, it is desirable to provide a scheme for managing metadata to improve efficiency of accessing metadata while saving storage space.

SUMMARY

Embodiments of the present disclosure generally relate to a method, an apparatus and a computer program product for managing metadata of a storage object.

In a first aspect of the present disclosure, there is provided a method for managing metadata of a storage object. The method comprises: in response to receiving a request to access metadata of a storage object, obtaining a first identifier of the storage object from the request; determining, based on the first identifier, a second identifier of a page where the metadata is located, an address of the page and the second identifier being stored in association in an entry of a page table distributed among a plurality of storage devices with different access speeds; determining, from the plurality of storage devices, a storage device storing the entry; and obtaining the address of the page by accessing the entry from the storage device, so as to access the metadata from the page.

In a second aspect of the present disclosure, there is provided an apparatus for managing metadata of a storage object. The apparatus comprises at least one processing unit and at least one memory. The at least one memory is coupled to the at least one processing unit and stores instructions for execution by the at least one processing unit. The instructions, when executed by the at least one processing unit, cause the apparatus to perform actions comprising: in response to receiving a request to access metadata of a storage object, obtaining a first identifier of the storage object from the request; determining, based on the first identifier, a second identifier of a page where the metadata is located, an address of the page and the second identifier being stored in association in an entry of a page table distributed among a plurality of storage devices with different access speeds; determining, from the plurality of storage devices, a storage device storing the entry; and obtaining the address of the page by accessing the entry from the storage device, so as to access the metadata from the page.

In a third aspect of the present disclosure, there is provided a computer program product for managing a disk array. The computer program product is tangibly stored on a non-transitory computer storage medium and comprises machine executable instructions. The machine executable instructions, when executed by a device, cause the device to perform any step of the method according to the first aspect of the present disclosure.

The Summary is provided to introduce a selection of concepts in a simplified form, which are further described in the Detailed Description. The Summary is not intended to identify key features or essential features of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the exemplary embodiments of the present disclosure, the same reference numerals generally indicate the same components.

In the various figures, the same or corresponding reference numerals indicate the same or corresponding parts.

DETAILED DESCRIPTION OF EMBODIMENTS

Figure 1:
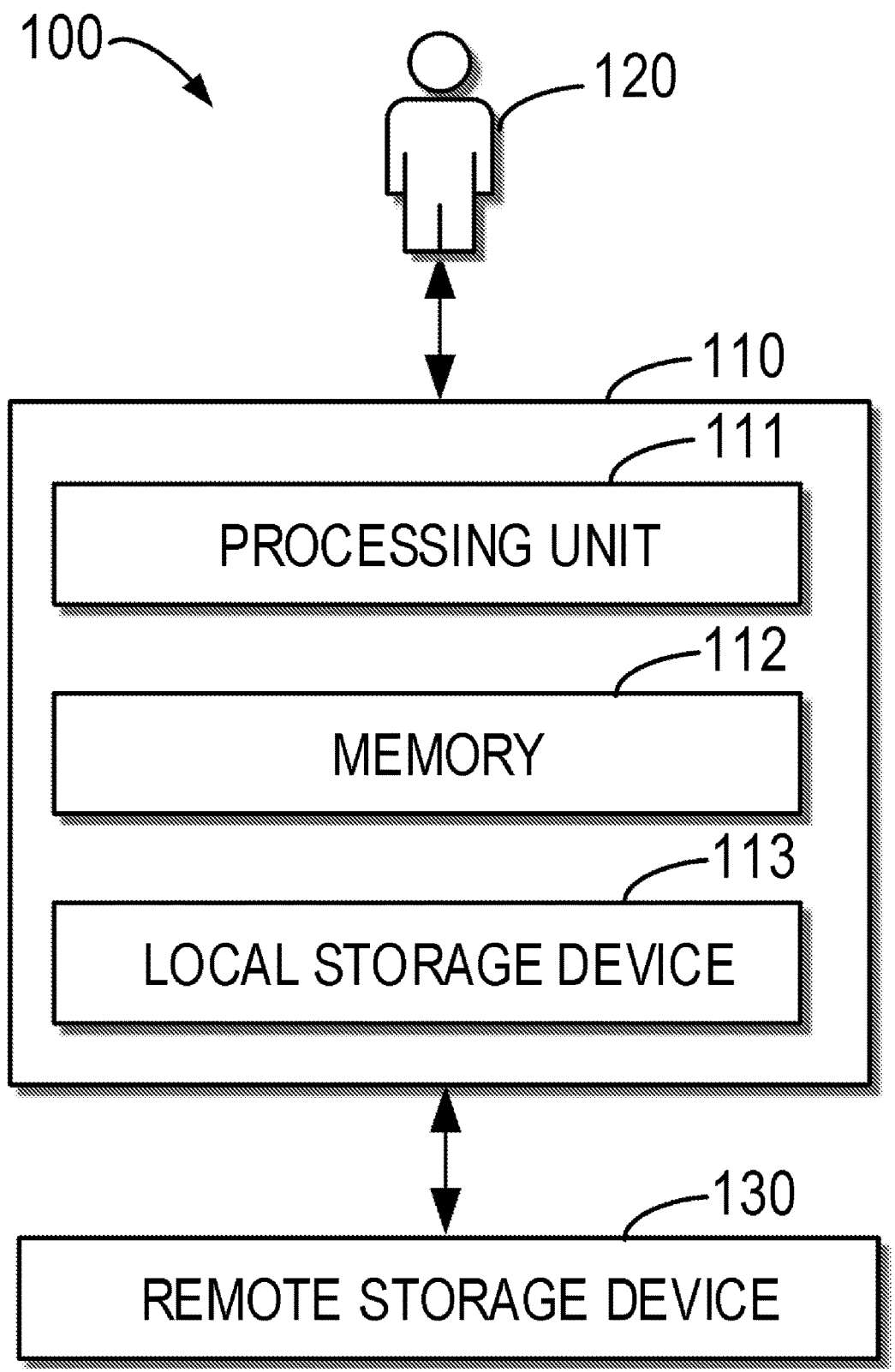
FIG. 1 is a diagram illustrating an example environment in which embodiments of the present disclosure can be implemented.

Preferred embodiments of the present disclosure will now be described in more detail with reference to the drawings. Although the preferred embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As described above, in the object storage system, all storage space can be divided into fixed-size chunks. User data can be stored as an object (also referred to as a "storage object") stored in a chunk. The object may have metadata associated with it for recording attributes and other information of the object (such as an address of the object, etc.). Before actually accessing a storage object, it is usually required to first access the metadata of the object. Due to importance of metadata and high frequency of access, it is desirable to provide a scheme for managing metadata to improve efficiency of accessing metadata while saving storage space.

Some conventional schemes utilize an index structure such as a B+ tree to manage the metadata of a storage object. For example, the identifier (ID) and metadata of the storage object are stored as a key-value pair in an index structure such as a B+ tree, and the B+ tree can be stored on the storage disk. When it is required to access the metadata of the storage object, the storage disk can be searched, based on the identifier of the storage object, for the metadata of the object. However, the access speed of the storage disk is usually relative low (for example, compared with that of the memory), and thus these schemes fail to achieve high access efficiency.

Other conventional schemes store metadata of an object into a page on a storage disk. The identifier of the object and the address of the page are stored as a key-value pair in an index structure such as B+ tree, and the B+ tree can be stored on the storage disk and loaded into the memory when the system starts up. When it is required to access the metadata of the storage object, the address of the page where the metadata is located may be obtained from the memory according to the identifier of the storage object, and then the metadata in the page is accessed from the obtained address. These schemes can improve the access efficiency of metadata to a certain extent, but require a large amount of memory space.

Embodiments of the present disclosure propose a scheme for managing metadata of a storage object, so as to address one or more of the above problems and other potential problems. The scheme stores an identifier of a storage object and an identifier of a page where the metadata is located as a key-value pair in an index structure. The identifier of the page and a corresponding page address are stored in association in the page table. The page table is divided into a plurality of blocks, and each of the blocks is stored in a corresponding storage device among a plurality of storage devices with different access speeds according to the access frequency of associated metadata. In this way, embodiments of the present disclosure can improve the efficiency of accessing metadata in the object storage system while saving storage space.

Embodiments of the present disclosure will be described in detail below with reference to the accompanying drawings.

FIG. 1 is a diagram illustrating an example environment 100 in which embodiments of the present disclosure may be implemented. It should be understood that the structure of the environment 100 is described merely for the purpose of illustration and is not intended to limit the scope of the disclosure. For example, embodiments of the present disclosure may also be applied to another environment different from the environment 100.

As shown in FIG. 1, the environment 100 may include a host 110 and a remote storage device 130 accessible by the host 110. The host 110 may include a processing unit 111, a memory 112, and a local storage device 113. The host 110 can be any of a physical computer, a server, or the like. Examples of the memory 112 may include, but are not limited to, a random access memory (RAM), a read only memory (ROM), an erasable programmable read only memory (EPROM or flash), a static random access memory (SRAM), and the like. The local storage device 113 can be implemented with any non-volatile storage medium currently known or to be developed in the future with a lower access speed than the memory 112, such as a solid state disk (SSD) or the like. In some embodiments, the local storage device 113 may act as a cache at the host 110. Alternatively, in some embodiments, the storage device 113 may be absent from the host 110. The remote storage device 130 may be a storage device separate from the host 110, which may be shared by multiple hosts (only one of which is shown in FIG. 1). The remote storage device 130 can be implemented with any non-volatile storage medium currently known or to be developed in the future, such as a magnetic disk, an optical disk, a disk array, and the like. For example, the access speed of the remote storage device 130 is lower than that of the local storage device 113.

In some embodiments, the environment 100 can be implemented as a distributed object storage system. In the following text, the environment 100 is sometimes referred to as a distributed object storage system 100. In some embodiments, the storage space of the remote storage device 130 can be partitioned into fixed size chunks. User data can be stored as a storage object in a chunk. A storage object may have metadata associated with it for recording attributes of the object and other information (such as, an address of the object, etc.). The metadata of the storage object may be stored in at least some of the chunks in units of pages. An identifier of the storage object and an identifier of the page where the metadata of the storage object is located may be stored, for example, as a key-value pair in an index structure (such as, a B+ tree). In addition, identifiers of all pages and respective page addresses can be recorded in a page table. The page table may be distributed among a plurality of storage devices with different access speeds, the plurality of storage devices including, for example, the memory 112, the local storage device 113 and a remote storage device 130.

In some embodiments, the page table may include a plurality of blocks. Each block may include several entries, each of which may record information of a page (e.g., the identifier and the page address of the page). In some embodiments, each block in the page table can be stored in one of the memory 112, the local storage device 113, and the remote storage device 130 in accordance with the frequency of accesses to the metadata associated with the block. For example, one or more blocks with the highest access frequency may be stored in the memory 112 with the highest access speed, and one or more blocks with the second highest access frequency may be stored in local storage device 113 with the second highest access speed. One or more blocks with the lowest access frequency may be stored in the remote storage device 130 with the lowest access speed. Moreover, as will be further described below, each block in the page table can be migrated among different storage devices (i.e., the memory 112, the local storage device 113, and the remote storage device 130) depending on the frequency of accesses to the metadata associated with the block.

In some embodiments, a user 120 may access a storage object in the distributed object storage system 130. For example, the user 120 can send a request to the host 110 to access a certain storage object. In response to receiving the request, the host 110 may first access the metadata of the storage object, for example, to obtain the address, attributes, and other information of the object. Then, the host 110 can access the user data corresponding to the storage object based on the metadata of the storage object, and return the user data to the user 120.

In some embodiments, when the host 110 receives a request from the user 120 to access a storage object or metadata of the storage object, the host 110 (e.g., the processing unit 111) may obtain an identifier (referred to herein as a "first identifier") of the storage object from the request. The host 110 may search the index structure described above based on the first identifier to determine an identifier (referred to herein as a "second identifier") of a page where the metadata is located. The page address and the second identifier of the page may be stored in association in the above page table, for example, as an entry in the page table. The host 110 can determine, from the memory 112, the local storage device 113, and the remote storage device 130, the storage device in which the entry is located, and obtain the address of the page where the metadata is located by accessing the entry. In this way, the host 110 can access the metadata of the storage object from the obtained page address.

Figure 2A:
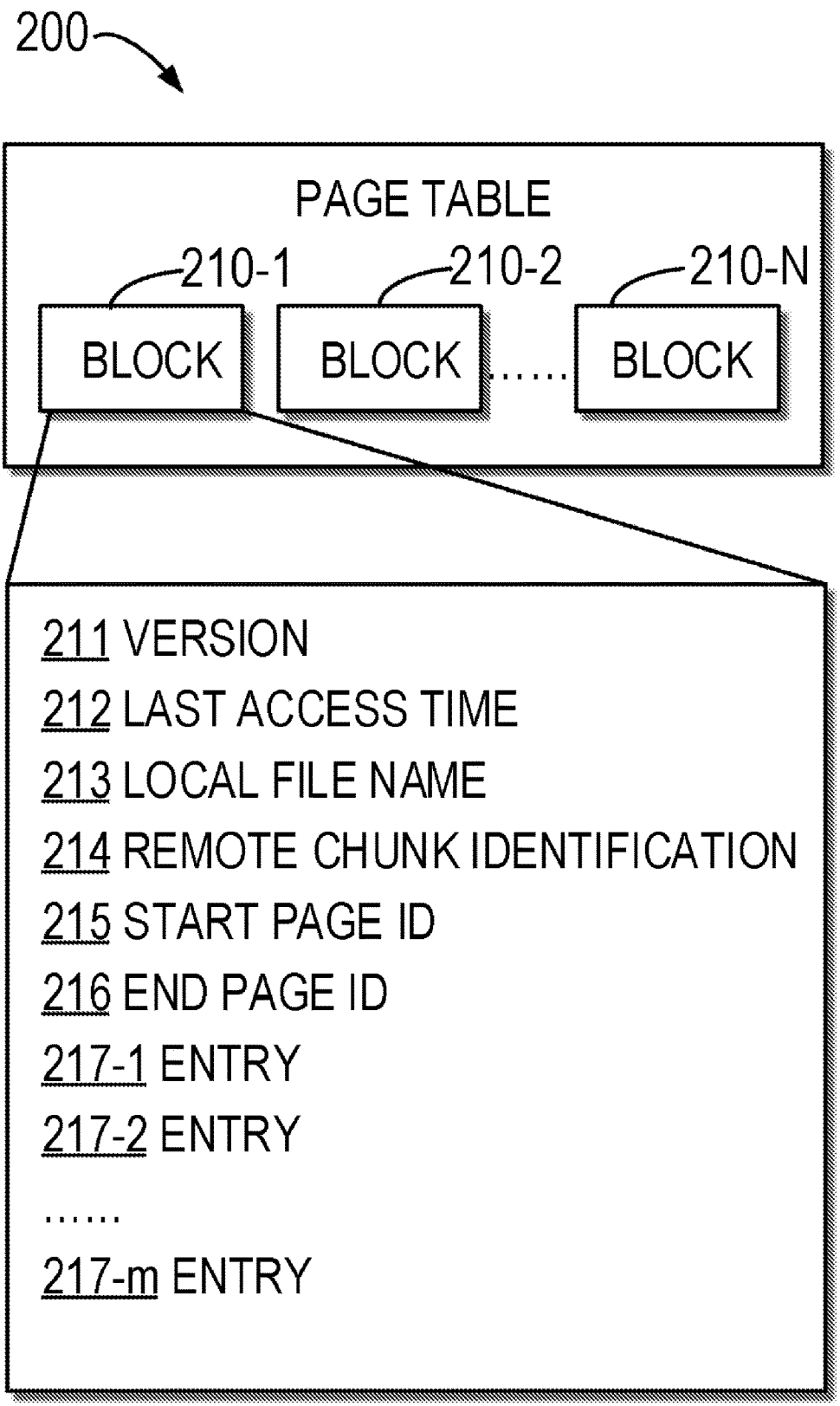
FIG. 2A illustrates a schematic diagram of an example page table in accordance with embodiments of the present disclosure.

FIG. 2A shows a schematic diagram of an example page table 200 in accordance with embodiments of the present disclosure. The example page table 200 may include a plurality of blocks 210-1, 210-2, . . . , 210-N (collectively or individually referred to as "block(s) 210", where N≥1). Each block 210 can include the following fields: a block version 211, a last access time 212, a local file name 213, a remote chunk identification 214, a start page identifier 215, an end page identifier 216, and one or more entries 217-1 . . . 217-$m$ (collectively or individually referred to as "entry 217" or "entries 217", where m≥1).

Each of the entries 217 can record a pair of page ID and page address. For example, the page identifier in the entry 217 may be within a range defined by the start page identifier 215 and the end page identifier 216. The block version 211 may indicate the version number of the block 210. For example, when the block 210 is updated or modified (e.g., certain pages involved in block 210 are modified or deleted), the block version 211 can be modified accordingly. The last access time 212 may indicate the time at which the block 210 was last accessed (e.g., read or write). For example, when accessing the entry 217 in the block 210, the last access time 212 can be updated accordingly. The local file name 213 may indicate the name of the file in the local storage device 113 corresponding to the block 210 when the block 210 is stored in the local storage device 113. For example, when block 210 is first migrated from memory 112 to local storage device 113, a file corresponding to the block 210 can be created at the local storage device 113, and the name of the file can be recorded at the field 213 in block 210. The remote chunk identification 214 can indicate an identifier of a chunk used for storing the block 210 when the block 210 is stored at the remote storage device 130.

Figure 2B:
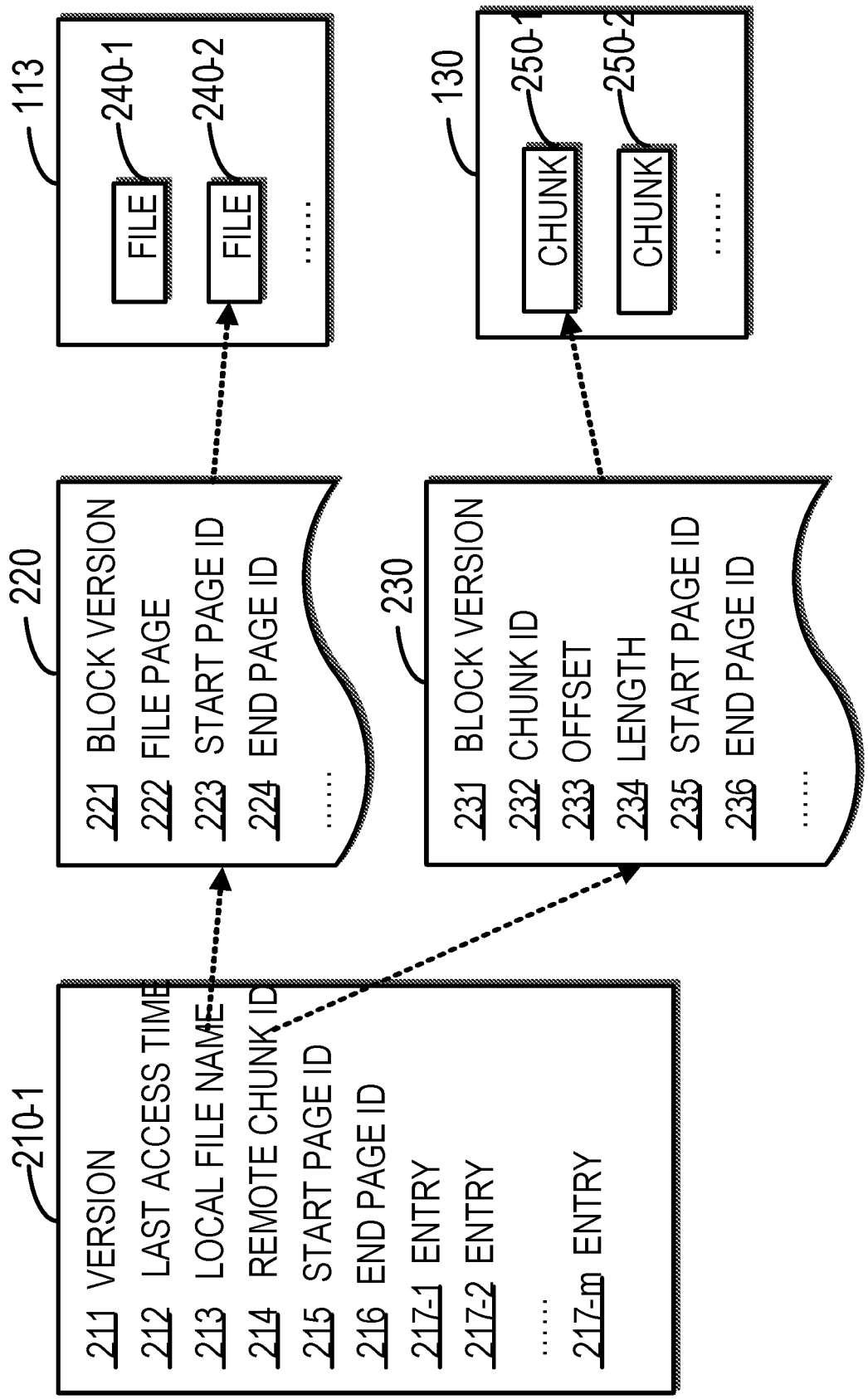
FIG. 2B illustrates a schematic diagram of how blocks of a page table are indexed and stored on a local storage device and a remote storage device in accordance with embodiments of the present disclosure.

FIG. 2B further illustrates a schematic diagram of how blocks of a page table are indexed and stored on a local storage device and a remote storage device in accordance with embodiments of the present disclosure. As shown in FIG. 2B, the local storage device 113 may include, for example, a plurality of files 240-1, 240-2, . . . , etc. corresponding to the plurality of blocks 210 in the page table. The remote storage device 130 can be divided, for example, into a plurality of chunks 250-1, 250-2, . . . , etc. The block 210-1 may correspond to, for example, the file 240-2 and the chunk 250-1.

In some embodiments, when the block 210-1 of the page table in the memory 112 is first migrated to the local storage device 113, a file corresponding to the block 210-1 (e.g., the file 240-2 shown in FIG. 2B) can be created at the local storage device 113. For example, the file name may act as an identifier that uniquely identifies the block and may be recorded at the field 213 in block 210-1. In some embodiments, the local file 240-2 can be optionally compressed to further reduce the storage space occupied.

In some embodiments, an index structure 220 for the local file 240-2 can be maintained at the memory 112 to facilitate migration of the file 240-2 (i.e., the block 210-1 at the local storage device 113) into the memory 112 as needed. As shown in FIG. 2B, the local file index structure 220 may include, for example, a block version 221 (for example, which may be the same as the block version 211 in the block 210-1), a local file name 222 (for example, which may be the same as the local file name 213 in the block 210-1), a start page identifier 223 of the block (for example, which may be the same as the start page identifier 215 in the block 210-1), and an end page identifier 224 (for example, which may be same as the end page identifier 216 in block 210-1). It should be understood that the fields included in the local file index structure 220 are shown merely for the purpose of illustration and are not intended to limit the scope of the disclosure. In some embodiments, the local file index structure 220 may also include additional fields not shown or omit some illustrated fields.

In some embodiments, initially, the block 210-1 in the page table 200 may be created at the remote storage device 130 (for example, at the chunk 250-1). In response to the block 210-1 being created at the chunk 250-1, the identification information of the chunk 250-1 may be recorded at the field 214 in the block 210-1. In some embodiments, an index structure 230 for the chunk 250-1 can be maintained at the memory 112 to facilitate migration of the block 210-1 from the remote storage device 130 to the memory 112 as needed. As shown in FIG. 2B, the remote chunk index 230 may include, for example, a block version 231 (for example, which may be the same as the block version 211 in block 210-1), a remote chunk identifier 232 (for example, which may correspond to the remote chunk identifier 214 in the block 210-1), an offset position 233 of the block 210-1 in the chunk 250-1, and a length 234 of the storage area occupied by the block 210-1 in the chunk 250-1, a start page identifier 235 (for example, which may be the same as the start page identifier 215 in block 210-1) and an end page identifier 236 (for example, which may be the same as the end page identifier 216 in block 210-1). It should be understood that the fields included in the remote chunk index 230 are shown only for the purpose of illustration and are not intended to limit the scope of the disclosure. In some embodiments, the remote chunk index 230 may also include additional fields not shown or omit certain of the illustrated fields.

Figure 3:
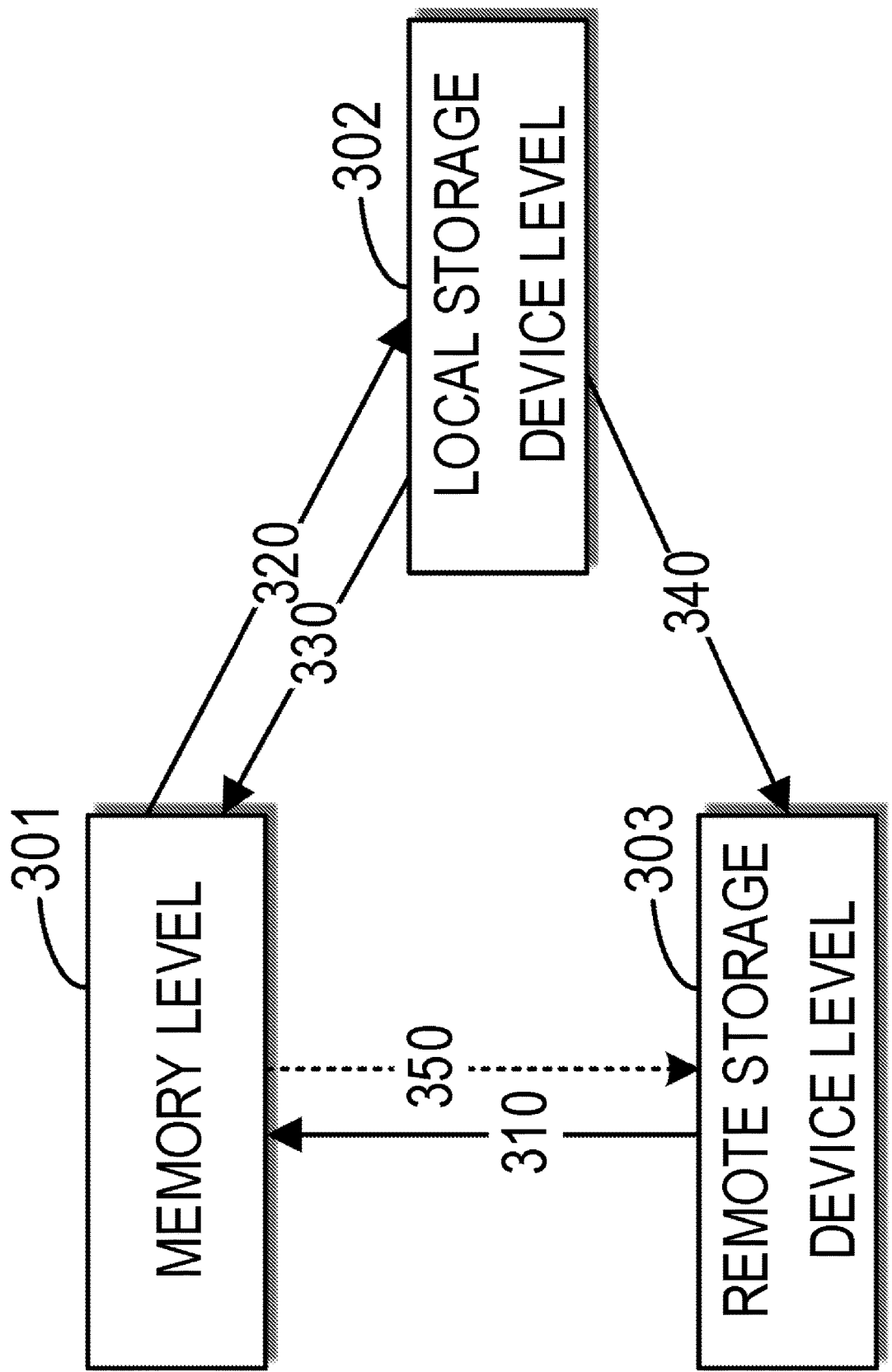
FIG. 3 illustrates a schematic diagram of migration of blocks of a page table among different storage devices in accordance with embodiments of the present disclosure.

FIG. 3 illustrates a schematic diagram of migration of blocks of a page table among different storage devices with different access speeds in accordance with embodiments of the present disclosure. At any time, each block 210 of the page table 200 as shown in FIG. 2A can be stored in one of the memory 112, the local storage device 113, and the remote storage device 130 as shown in FIG. 1. That is, the block 210 may be at a memory level 301, a local storage device level 302, or a remote storage device level 303.

In some embodiments, initially, the page table 200 can be created at the remote storage device 130. That is, initially, each block 210 of the page table 200 can be at the remote storage device level 303.

In some embodiments, when a certain block 210 located in the remote storage device 130 is accessed, the block 210 can be migrated from the remote storage device 130 to the memory 112. That is, the block 210 can be converted 310 from the remote storage device level 303 to the memory level 301. Alternatively, in some embodiments, depending on predetermined configuration information, when a certain block 210 located in the remote storage device 130 is accessed only once, the block 210 may not be migrated to the memory 112. The block 210 may be migrated to the memory 112 only when the block 210 located in the remote storage device 130 is accessed a threshold number of times, or is accessed a threshold number of times during a particular time period, thereby saving storage space of the memory 112.

In some embodiments, if a block 210 located in the memory 112 has not been accessed for a duration (for example, the duration may be determined based on the last access time 212 as shown in FIG. 2A) exceeding a threshold time (also referred to herein as "first threshold time"), the block 210 in the memory 112 can be migrated to the local storage device 113. That is, the block 210 can be converted 320 from the memory level 301 to the local storage device level 302.

Additionally or alternatively, in some embodiments, when the available capacity in the memory 112 is below a threshold capacity (also referred to herein as "first threshold capacity"), one or more of the blocks 210 in the memory 112 can be selected based on a least recently used (LRU) algorithm and migrated to the local storage device 113. That is, the one or more blocks 210 can be converted 320 from the memory level 301 to the local storage device level 302.

In some embodiments, when a certain block 210 located in the local storage device 113 is accessed, the block 210 can be migrated from the local storage device 113 to the memory 112. That is, the block 210 can be converted 330 from the local storage device level 302 to the memory level 301. Alternatively, in some embodiments, depending on predetermined configuration information, when a certain block 210 located in the local storage device 113 is accessed only once, the block 210 may not be migrated to the memory 112. The block 210 may be migrated to the memory 112 only when the block 210 located in the local storage device 113 is accessed a threshold number of times, or is accessed a threshold number of times during a particular time period, thereby saving storage space of the memory 112.

In some embodiments, if a block 210 located in the local storage device 113 has not been accessed for a duration (for example, the duration may be determined based on the last access time 212 as shown in FIG. 2A) exceeding a threshold time (referred to as "second threshold time"), the block 210 in the local storage device 113 may be migrated to the remote storage device 130. That is, the block 210 can be converted 340 from the local storage device level 302 to the remote storage device level 303.

Additionally or alternatively, in some embodiments, when the available capacity in the memory 113 is below a threshold capacity (also referred to herein as "second threshold capacity"), one or more of the blocks 210 in the local storage device 113 can be selected based on a least recently used (LRU) algorithm and migrated to the remote storage device 130. That is, the one or more blocks 210 can be converted 340 from the local storage device level 302 to the remote storage device level 303.

Alternatively, in some embodiments, in the event that the local storage device 113 is absent, if a block 210 located in the memory 112 has not been accessed for a duration exceeding the first threshold time and/or the available capacity in the memory 112 is below the first threshold capacity, the block 210 in the memory 112 can be migrated to the remote storage device 130. That is, the block 210 can be converted 350 from the memory level 301 to the remote storage device level 303.

Figure 4:
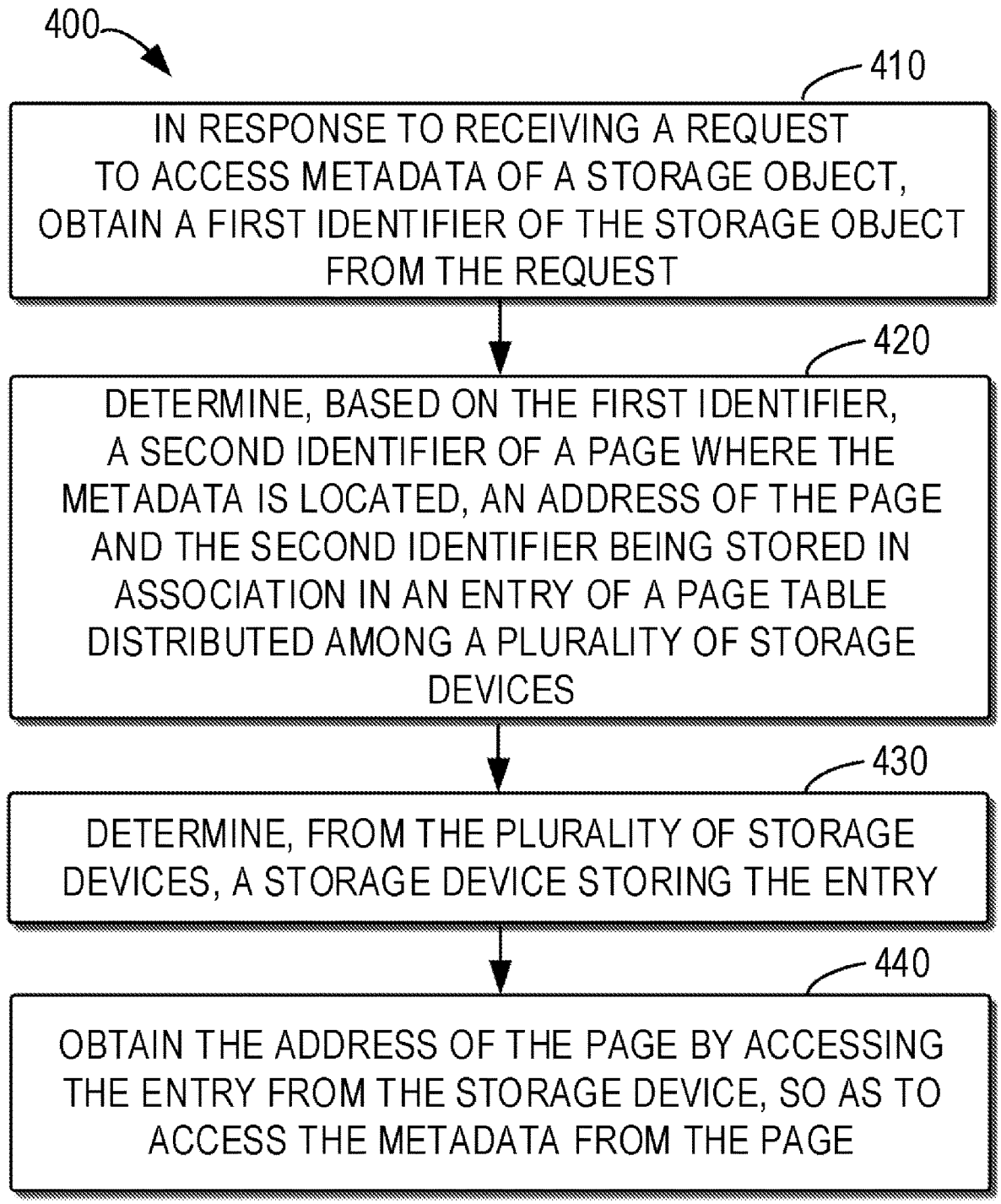
FIG. 4 illustrates a flowchart of an example method for managing metadata of a storage object in accordance with embodiments of the present disclosure.

FIG. 4 shows a flowchart of an example method 400 for managing metadata of a storage object in accordance with embodiments of the present disclosure. For example, the method 400 can be performed by the host 110 as shown in FIG. 1. It is to be understood that the method 400 may also include additional actions not shown and/or may omit the illustrated actions, and the scope of the present disclosure is not limited in this respect.

At block 410, in response to receiving a request to access metadata of the storage object, the host 110 obtains a first identifier of the storage object from the request.

At block 420, the host 110 determines, based on the first identifier, a second identifier of the page where the metadata is located. In some embodiments, an address of the page and the second identifier are stored in association in an entry of a page table distributed among a plurality of storage devices with different access speeds.

In some embodiments, the host 110 may determine a second identifier by: obtaining an index structure associated with the page table, the first identifier and the second identifier being recorded as a key-value pair in the index structure; searching for the key-value pair associated with the first identifier in the index structure; and determining the second identifier based on the searched key-value pair.

In some embodiments, the index structure is implemented as a B+ tree.

In some embodiments, the plurality of storage devices include at least a first storage device, a second storage device and a third storage device, where a first access speed of the first storage device exceeds a second access speed of the second storage device and the second access speed of the second storage device exceeds a third access speed of the third storage device.

In some embodiments, the first storage device is a memory, the second storage device is a local storage device and the third storage device is a remote storage device.

At block 430, the host 110 determines, from the plurality of storage devices, a storage device storing the entry. Then, at block 440, the host 110 obtains the address of the page by accessing the entry from the storage device, so as to access the metadata from the page.

In some embodiments, the host 110 may first determine whether the entry is present in the first storage device. In response to determining that the entry is present in the first storage device, the host 110 may determine the first storage device as the storage device storing the entry. In response to determining that the entry is absent from the first storage device, the host 110 may further determine whether the entry is present in the second storage device. In response to determining that the entry is present in the second storage device, the host 110 may determine the second storage device as the storage device storing the entry. In response to determining that the entry is absent from the second storage device, the host 110 may further determine whether the entry is present in the third storage device. In response to determining that the entry is present in the third storage device, the host 110 may determine the third storage device as the storage device storing the entry.

In some embodiments, the page table includes a plurality of blocks, each of the plurality of blocks is stored in one of the plurality of storage devices, and the entry is included in a first block of the plurality of blocks. In some embodiments, the host 110 may determine the storage device storing the first block from the plurality of storage devices and obtain the address of the page by accessing the entry from the first block.

In some embodiments, in response to determining that the first block is stored in the second storage device or the third storage device, the host 110 migrates the first block from the second storage device or the third storage device to the first storage device.

In some embodiments, the plurality of blocks include a second block stored in the first storage device. The host 110 migrates the second block from the first storage device to the second storage device in response to determining at least one of the following: available capacity of the first storage device is below first threshold capacity; and the second block has not been accessed for a duration exceeding a first threshold time.

In some embodiments, the plurality of blocks include a third block stored in the second storage device. The host 110 migrates the third block from the second storage device to the third storage device in response to determining at least one of the following: available capacity of the second storage device is below second threshold capacity; and the third block has not been accessed for a duration exceeding a second threshold time.

It can be seen from the above description that the solution for managing metadata of a storage object proposed by embodiments of the present disclosure can solve one or more of the problems existing in the conventional solution and other potential problems. Embodiments of the present disclosure an identifier of a storage object and an identifier of a page where the metadata is located as a key-value pair in an index structure. The identifier of the page and a corresponding page address are stored in association in the page table. The page table is divided into a plurality of blocks, and each of the blocks is stored in a corresponding storage device among a plurality of storage devices with different access speeds according to the access frequency of associated metadata. In this way, embodiments of the present disclosure can improve the efficiency of accessing metadata in the object storage system while saving storage space.

Figure 5:
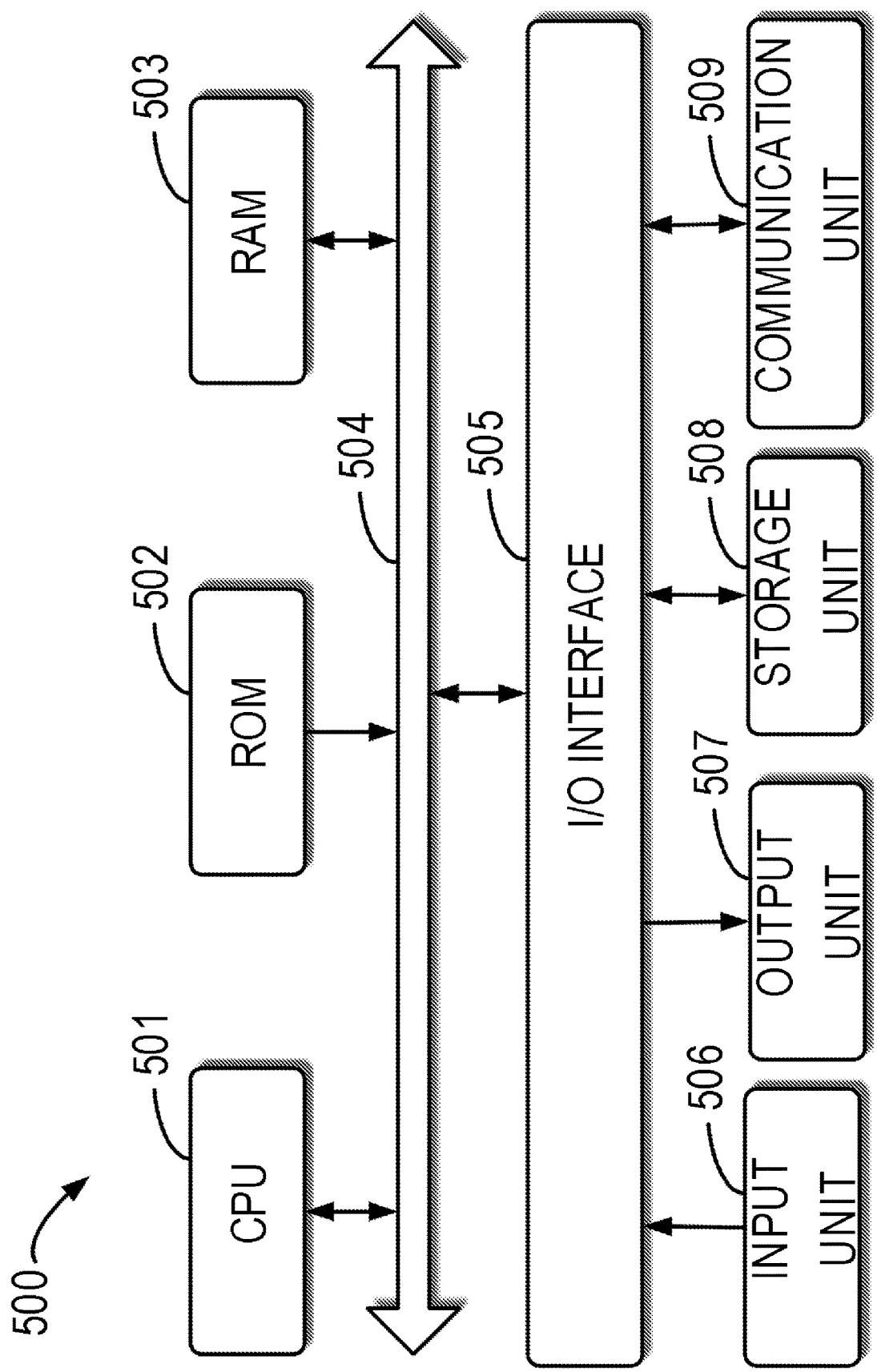
FIG. 5 illustrates a schematic block diagram of an example device that can be used to implement embodiments of the present disclosure.

FIG. 5 is a block diagram illustrating a device 500 adapted to implement embodiments of the present disclosure. For example, the host 110 as shown in FIG. 1 can be implemented by the device 500. As shown in FIG. 5, the device 500 comprises a central processing unit (CPU) 501 that may perform various appropriate actions and processing based on computer program instructions stored in a read-only memory (ROM) 502 or computer program instructions loaded from a page 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

The following components in the device 500 are connected to the I/O interface 505: an input unit 506, such as a keyboard, a mouse and the like; an output unit 507 including various kinds of displays and a loudspeaker, etc.; a memory unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the method 400, may be executed by the processing unit 501. For example, in some embodiments, the method 400 may be implemented as a computer software program that is tangibly embodied on a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 400 as described above may be executed.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   in response to receiving a request to access metadata of a storage object, obtaining, by a system comprising a processor, a first identifier of the storage object from the request;
   analyzing, by the system, an access speed of ones of access devices of a group of storage devices;
   obtaining, by the system, a B+ index structure associated with the page table, with the first identifier and a second identifier being recorded as a key-value pair in the index structure, wherein the first identifier comprises an index key of the B+ tree index structure and the second identifier, paired to the index key, comprises a reference to a page address;
   determining, by the system, based on the first identifier as an index key to B+ index structure, the second identifier referencing a page address where the metadata is located, the page address being stored in an entry of a block of a page table comprising a plurality of blocks, wherein respective blocks of the plurality of blocks:
      were analyzed to estimate an access frequency of the respective blocks;
      based on the access frequency, were stored among selected ones of a plurality of storage devices, wherein the selected ones of the plurality of storage devices were analyzed to determine an access speed of the selected ones of the plurality of storage devices, and
      were stored based on the access frequency by matching the access speed of the selected ones of the plurality of storage devices with the estimated access frequency of the respective blocks,
   determining, by the system, from the plurality of storage devices, a storage device storing the entry; and
   based on the address of the page, accessing, by the system, the metadata corresponding to the request to access metadata.

2. The method of claim 1, wherein the plurality of storage devices comprises at least a first storage device, a second storage device and a third storage device, and wherein a first access speed of the first storage device exceeds a second access speed of the second storage device and the second access speed of the second storage device exceeds a third access speed of the third storage device.

3. The method according to claim 2, wherein the first storage device comprises a memory, the second storage device comprises a local storage device and the third storage device comprises a remote storage device.

4. The method of claim 2, wherein the determining the storage device storing the entry from the plurality of storage devices comprises:
determining whether the entry is present in the first storage device;
in response to determining that the entry is present in the first storage device, determining the first storage device as the storage device storing the entry;
in response to determining that the entry is absent from the first storage device, determining whether the entry is present in the second storage device;
in response to determining that the entry is present in the second storage device, determining the second storage device as the storage device storing the entry;
in response to determining that the entry is absent from the second storage device, determining whether the entry is present in the third storage device; and
in response to determining that the entry is present in the third storage device, determining the third storage device as the storage device storing the entry.

5. The method of claim 2, wherein the entry is comprised in a first block of the plurality of blocks,
wherein the determining the storage device from the plurality of storage devices comprises:
determining, from the plurality of storage devices, the storage device storing the first block; and
wherein the obtaining the address comprises:
obtaining the address by accessing the entry from the first block.

6. The method of claim 5, further comprising:
in response to determining that the first block is stored in the second storage device or the third storage device, migrating the first block from the second storage device or the third storage device to the first storage device.

7. The method of claim 5, wherein the plurality of blocks includes a second block stored in the first storage device, and wherein the method further comprises:
migrating, by the system, the second block from the first storage device to the second storage device in response to determining at least one of the following:
available capacity of the first storage device is below first threshold capacity; and
the second block has not been accessed for a duration exceeding a first threshold time.

8. The method of claim 5, wherein the plurality of blocks includes a third block stored in the second storage device, and wherein the method further comprises:
migrating, by the system, the third block from the second storage device to the third storage device in response to determining at least one of the following:
available capacity of the second storage device is below second threshold capacity; and
the third block has not been accessed for a duration exceeding a second threshold time.

9. An apparatus, comprising:
at least one processing unit; and
at least one memory coupled to the at least one processing unit and storing instructions for execution by the at least one processing unit, the instructions, when executed by the at least one processing unit, causing the apparatus to perform actions comprising:
in response to receiving a request to access metadata of a storage object, obtaining a first identifier of the storage object from the request;
obtaining a B+ index structure associated with the page table, with the first identifier and a second identifier being recorded as a key-value pair in the index structure, wherein the first identifier comprises an index key of the B+ tree index structure and the second identifier, paired to the index key, comprises a reference to a page address;
determining, based on the first identifier as an index key to B+ index structure, the second identifier referencing a page address where the metadata is located, the page address being stored in an entry of a block of a page table comprising a plurality of blocks:
were analyzed to estimate an access frequency of the respective blocks;
based on the access frequency, were stored among selected ones of a plurality of storage devices, wherein the selected ones of the plurality of storage devices were analyzed to determine an access speed of the selected ones of the plurality of storage devices, and
were stored based on the access frequency by matching an access speed of the selected ones of the plurality of storage devices with the estimated access frequency of the respective blocks; and
obtaining the address of the page by accessing the entry from a storage device of the plurality of storage devices, so as to access the metadata from the page.

10. The apparatus of claim 9, wherein the plurality of storage devices comprises at least a first storage device, a second storage device and a third storage device, and wherein a first access speed of the first storage device exceeds a second access speed of the second storage device and the second access speed of the second storage device exceeds a third access speed of the third storage device.

11. The apparatus of claim 10, wherein the first storage device comprises a memory, the second storage device comprises a local storage device and the third storage device comprises a remote storage device.

12. The apparatus of claim 10, wherein the determining the storage device storing the entry from the plurality of storage devices comprises:
determining whether the entry is present in the first storage device;
in response to determining that the entry is present in the first storage device, determining the first storage device as the storage device storing the entry;
in response to determining that the entry is absent from the first storage device, determining whether the entry is present in the second storage device;
in response to determining that the entry is present in the second storage device, determining the second storage device as the storage device storing the entry;
in response to determining that the entry is absent from the second storage device, determining whether the entry is present in the third storage device; and
in response to determining that the entry is present in the third storage device, determining the third storage device as the storage device storing the entry.

13. The apparatus of claim 10, wherein the entry is comprised in included in a first block of the plurality of blocks, wherein the determining the storage device from the plurality of storage devices comprises determining, from the plurality of storage devices, the storage device storing the first block wherein the obtaining the address comprises obtaining the address by accessing the entry from the first block.

14. The apparatus of claim 13, wherein the plurality of blocks includes a second block stored in the first storage device, and wherein the method further comprises:
migrating the second block from the first storage device to the second storage device in response to determining at least one of:
available capacity of the first storage device is below first threshold capacity; or
the second block has not been accessed for a duration exceeding a first threshold time.

15. The apparatus of claim 13, wherein the plurality of blocks includes a third block stored in the second storage device, and wherein the method further comprises:
migrating the third block from the second storage device to the third storage device in response to determining at least one of:
available capacity of the second storage device is below second threshold capacity; or
the third block has not been accessed for a duration exceeding a second threshold time.

16. A computer program product tangibly stored on a non-transitory computer storage medium and comprising machine executable instructions that, when executed by a device, cause the device to perform operations, comprising:
in response to receiving a request to access metadata of a storage object, obtaining a first identifier of the storage object from the request;
obtaining, by the system, a B+ index structure associated with the page table, with the first identifier and a second identifier being recorded as a key-value pair in the index structure,
wherein the first identifier comprises an index key of the B+ tree index structure and the second identifier, paired to the index key, comprises a reference to a page address;
determining, by the system, based on the first identifier as an index key to B+ index structure, the second identifier referencing a page address where the metadata is located, the page address being stored in an entry of a block of a page table comprising a plurality of blocks, wherein the plurality of blocks:
were analyzed to estimate an access frequency of respective blocks;
based on the access frequency, were stored among selected ones of a plurality of storage devices, wherein the selected ones of the plurality of storage devices were analyzed to determine an access speed of the selected ones of the plurality of storage devices, and
were respectively stored based on the access frequency by matching an access speed of the selected ones of the plurality of storage devices with the estimated access frequency of the respective blocks.

17. The computer program product of claim 16, wherein the operations further comprise obtaining the address of the page by accessing the entry from a storage device of the plurality of storage devices, so as to access the metadata from the page.

18. The computer program product of claim 16, wherein the plurality of storage devices comprises a first storage device, a second storage device and a third storage device, and wherein a first access speed of the first storage device exceeds a second access speed of the second storage device and the second access speed of the second storage device exceeds a third access speed of the third storage device.

19. The computer program product of claim 18, wherein the first storage device comprises a memory, the second storage device comprises a local storage device and the third storage device comprises a remote storage device.

20. The computer program product of claim 19, wherein determining the storage device that stores the entry from the plurality of storage devices comprises:
determining whether the entry is present in the first storage device;
in response to determining that the entry is present in the first storage device, determining the first storage device as the storage device storing the entry;
in response to determining that the entry is absent from the first storage device, determining whether the entry is present in the second storage device;
in response to determining that the entry is present in the second storage device, determining the second storage device as the storage device storing the entry;
in response to determining that the entry is absent from the second storage device, determining whether the entry is present in the third storage device; and
in response to determining that the entry is present in the third storage device, determining the third storage device as the storage device storing the entry.

* * * * *